F. MALRAUX.
MUD GUARD FOR VEHICLE WHEELS.
APPLICATION FILED MAY 4, 1914.

1,128,704.

Patented Feb. 16, 1915.
3 SHEETS—SHEET 1.

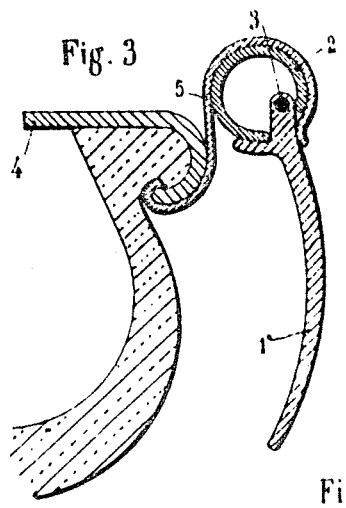
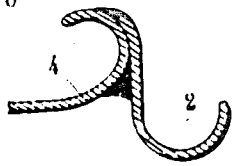
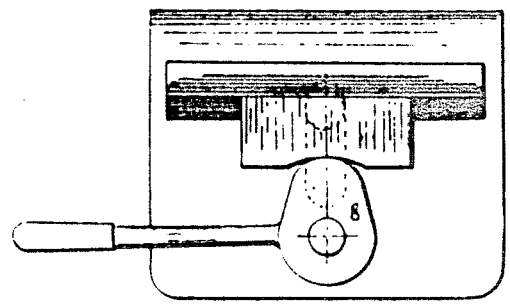
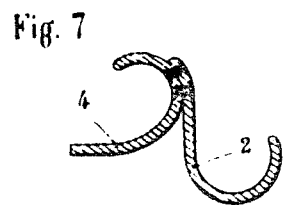
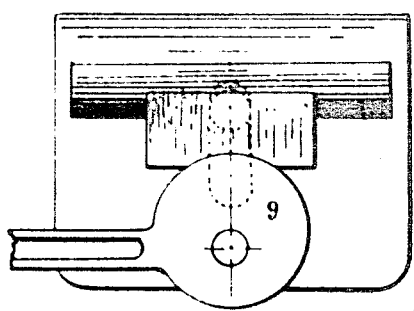
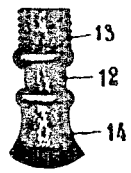

F. MALRAUX.
MUD GUARD FOR VEHICLE WHEELS.
APPLICATION FILED MAY 4, 1914.
1,128,704.
Patented Feb. 16, 1915.
3 SHEETS—SHEET 3.
Fig. 8
Fig. 9
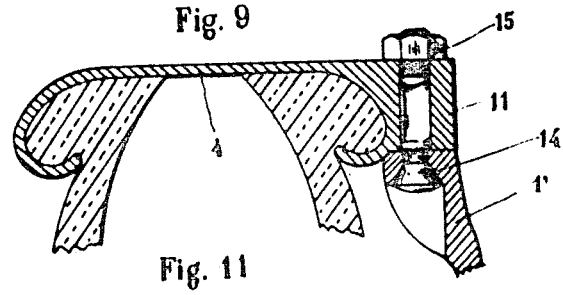
Fig. 11
Fig. 13 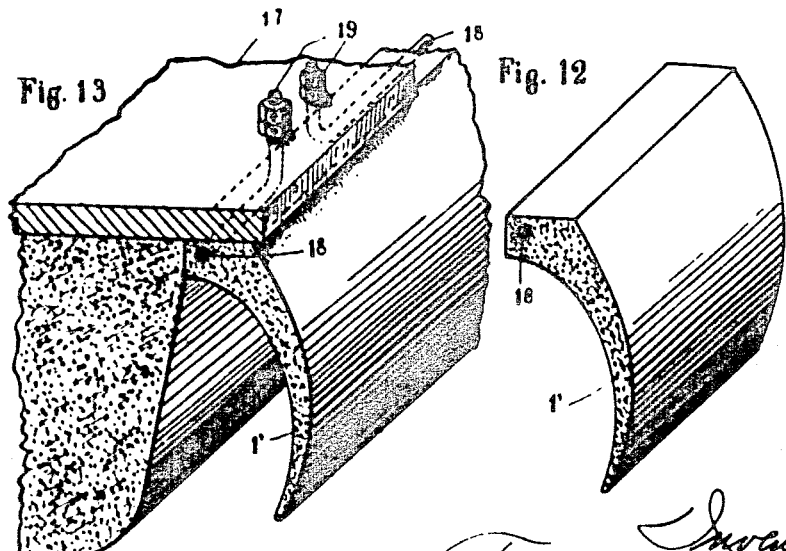 Fig. 12
Witnesses
Inventor:
Fernand Malraux
by B. Singer Atty

UNITED STATES PATENT OFFICE.

FERNAND MALRAUX, OF SURESNES, FRANCE.

MUD-GUARD FOR VEHICLE-WHEELS.

1,128,704.  Specification of Letters Patent.  Patented Feb. 16, 1915.

Application filed May 4, 1914. Serial No. 836,277.

*To all whom it may concern:*

Be it known that I, FERNAND MALRAUX, a citizen of the Republic of France, residing at 11 Boulevard de Versailles, Suresnes, Seine, France, have invented certain new and useful Improvements in Mud-Guards for Vehicle-Wheels, of which the following is a specification.

The present invention relates to a mudguard for the wheels of vehicles and is of the type comprising, as a screen intended to prevent lateral projections of mud, a continuous annular ring or flange formed of a flexible material such as india rubber, leather or the like.

The invention has for its object the method of fixing the said ring or collar on the wheel rim. The fixing means hereinafter described is essentially characterized by a metal hoop or circular member in a single piece in which the mudguard flange is held, this hoop or circular member being fixed to the wheel rim by clamps of appropriate form one of which is constructed in such a manner as to permit of tightening the hoop upon the rim. These clamps may be permanently fixed upon the rim or upon the hoop upon which they are then riveted, screwed, soldered or brazed. Finally in a modification of the invention the hoop itself may form one with the rim which is then given a special profile. In this case the flange can be supported by a wire in the known manner or be fixed to the rim by means of flexible fittings of special construction.

The invention is applicable to the wheels of all vehicles but is more particularly adapted to motor road vehicles and generally speaking, to the case of wheels provided with solid india rubber or pneumatic tires.

Figure 1:
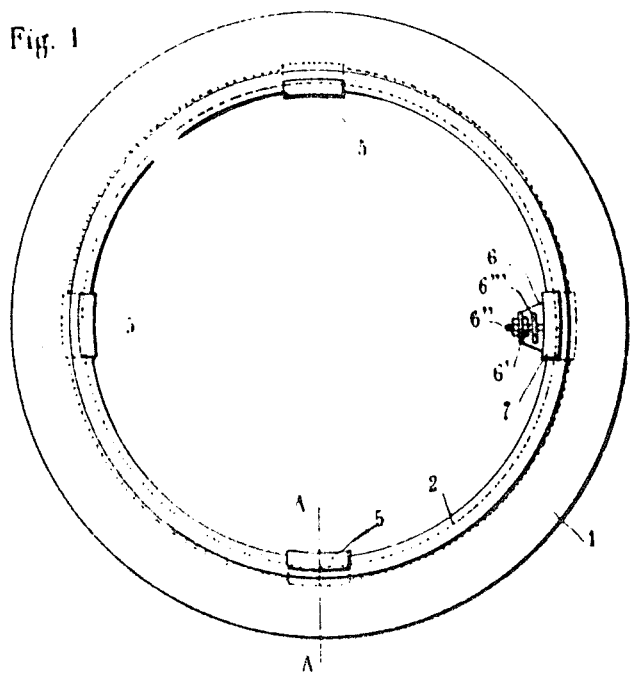
Figure 2:
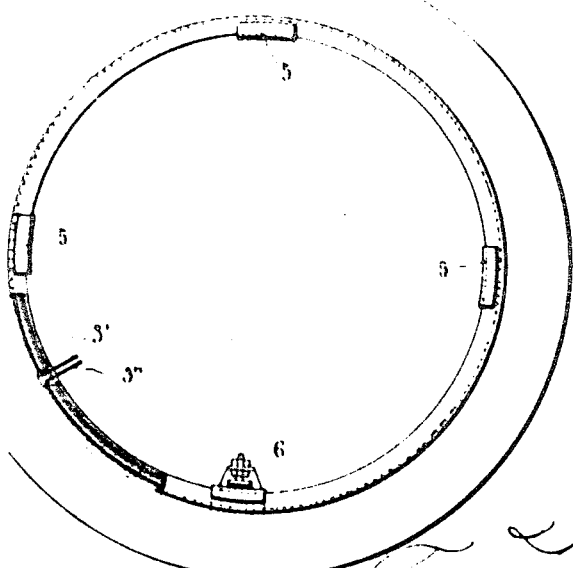

Various methods of carrying out the invention are illustrated by way of example in the accompanying drawings in which:

Figure 1 is a front elevation showing a rim to which a pneumatic tire is fitted and upon which the hoop provided with the mudguard flange is fixed by means of clamps. Fig. 2 is a similar view to Fig. 1 illustrating a modified method of fixing the mudguard flange upon the hoop. Fig. 3 is a section on the line A—A in Fig. 1. Figs. 4 and 5 represent modifications of the means for tightening the hoop upon the rim. Figs. 6 and 7 show in section a portion of a rim carrying one of the clamps for fixing the hoop, this clamp being soldered or brazed upon the rim (Fig. 6) or riveted upon it (Fig. 7). Fig. 8 shows in section a type of rim in which the hoop or circular member intended for the reception of the mudguard crown or flange is made in one with the rim which is then specially formed and profiled to this end. Fig. 9 shows, also in section, another type of rim specially designed for the reception of the mudguard ring which is fixed upon it, in this embodiment of the invention, by means of elastic nipples of special construction. Fig. 10 represents one of these elastic nipples. Fig. 11 is a section illustrating a modification of the type of rim represented in Fig. 8. Figs. 12 and 13 illustrate a modification of the invention for application to heavy vehicles. Fig. 12 represents a portion of the mudguard flange, and Fig. 13 shows it fitted to the rim.

In the construction illustrated in Figs. 1 and 3 the mudguard ring, screen or flange 1 formed of india rubber, leather or some other pliable material is held in the hoop 2 by a wire 3 embedded in the thickness of the inner edge of the collar and wrapped in canvas as shown in Fig. 3. The hoop 2 which is formed in a single piece (this is an essentially characteristic point in the invention) is fixed upon the rim 4 of the wheel by a device analogous to that which is utilized for fixing certain spare or emergency wheels. This method of fixing is effected by means of clamps 5 S-shaped in section as shown in Fig. 3; one of the loops of the S receives the mudguard collar 1, while the other loop is mounted upon the bend of the rim 4. The number of clamps 5 varies in accordance with the diameter of the wheel; in the greater number of cases three clamps arranged at intervals of 90° are employed (see Fig. 1). In order to securely fasten the hoop 2 upon the wheel, a fourth clamp 6 of special construction is employed (Figs. 1 and 2). The hook of this clamp bearing upon the flange of the rim 4 is prolonged by a portion 6' bent at right angles and perforated with a hole through which a bolt 6'' passes. This bolt is integral with the hook 7 intended for the reception of the hoop 2; the said bolt is guided in a collar 6''' integral with the clamp. It will readily be understood that if the nuts shown in the figures be screwed upon the bolt 6'' (one of these nuts serves as a lock nut) a tightening action is exerted in bearing upon the rim 4, and this tightening serves to lock the circle 2 upon the rim in a perfectly efficacious manner. The flange 1 can be held in the hoop 2 in any appropriate manner; this result can be obtained as in the case of wired-on pneumatic tires for bicycles, that is to say by providing the inner edge of the said collar with a wire 3 and introducing this wire into the hoop 2 in the same manner that a wired-on pneumatic tire cover is fitted to its rim by using appropriate levers. In order to render the fitting easier, the wire forming a complete circle can be replaced by a wire interrupted at a point, the two extremities of the wire being then directed toward the interior of the wheel as shown in Fig. 2. With this construction when fitting the device the two extremities 3', 3" of the wire are passed through a hole provided for this purpose in the hoop 2 whereupon the flange is mounted in the hoop as in the first case, but far more easily because the resistance opposed is appreciably less. When the flange is introduced into the hoop 2, the extremities 3' and 3" of the rod are twisted by means of pincers in such a manner as to produce a tightening effect, and when this tightening is sufficient, the rods 3', 3" are cut flush with the circle 2.

The method of tightening by means of the clamp 6 which has just been described, can be replaced by any other appropriate device constructed in such a manner as to produce a tightening action in the direction of a radius of the wheel; for example this tightening can be effected by means of a cam device 8 as shown in Fig. 4 or by means of eccentric roller 9 as shown in Fig. 5.

In the method of fixing that has just been described, the fixing clamps 5 are independent of the rim 4. As shown in Figs. 6 and 7, it is also possible to fix these clamps permanently upon the rim; this fixing can be effected by autogenous welding or brazing (Fig. 6), by riveting, (Fig. 7), by means of screws or in any other appropriate manner. In this case when it is desired to fit a mudguard upon the wheel it is only necessary to fit the hoop 2 provided with its mudguard and to clamp it either by means of the device illustrated in Figs. 1 and 2 or by means of one of the devices represented in Figs. 4 and 5. The clamps may also be fixed to the circle 2. It will be noted that whatever method of fixing the hoop 2 upon the rim 4 be adopted, the mudguard thus constituted is exceedingly strong and efficaciously resists all shocks that the wheel may receive during the running of the vehicle and particularly contact with sidewalk curbs. It is also possible to employ a specially manufactured rim such that the rim proper and the hoop or circular member intended for the reception of the mudguard flange are in a single piece; Figs. 8 and 9 illustrate two constructional forms of such a rim. In the first of these constructions (Fig. 8) the rim is intended for the reception of a mudguard screen or flange held in the groove 10 by a wire in the manner indicated above. It is obvious that in this case also the circular member supporting the mudguard and this mudguard itself, will resist shocks of any degree of violence. It is also possible in order to utilize rims of the ordinary type to fit and fix upon these rims (by soldering, brazing, riveting or the like) a ring 16 of appropriate profile (Fig. 11) presenting a groove 10' which serves the same purpose as the groove 10 in the special rim illustrated in Fig. 8. In the construction illustrated in Fig. 9 the mudguard 1' which is of rather special form is supported upon the flange 11 of the rim by means of special elastic fixing nipples one of which is shown separately in Fig. 10. These nipples are formed by a length of elastic cord 12 to the extremities of which there are fitted at one end an externally threaded socket 13 and on the other end a part 14 forming a head, wires 15 tightened upon the elastic cord 12 maintain the parts 13 and 14 in place. As shown in Fig. 9, these elastic nipples pass through holes formed in the mudguard 1' and in the flange 11, the head 14 retaining them at one extremity and a nut 15 screwed on the threaded socket 13 insuring the necessary tightness. The elasticity of the core 12 of the nipple permits of all the displacements of the mudguard 1' rendered necessary by inequalities of the ground.

In the case of the wheels of heavy vehicles with a projecting rim 17, the mudguard flange 1' is constructed as shown in Fig. 12. A wire 18 is embedded in proximity to its inner edge; the mudguard flange is fitted against the rim in the manner indicated in Fig. 13; the extremities of the wire 18 pass through holes provided for this purpose in the rim 17; these extremities are threaded for the reception of the nuts 19 by means of which a tightening effect sufficient to maintain the collar in place, is produced. One only of the extremities of the wire 18 need be threaded, the other extremity being rendered integral with the rim by any appropriate means.

What I claim and desire to secure by Letters Patent is:—

1. A mudguard for wheels comprising an annular flange, an annular tubular member receiving the inner edge of said annular flange, said member attached to the wheel rim, a securing wire embedded in the annular flange, and means for fixing said annular tubular member to the wheel rim.

2. A mudguard for wheels comprising an annular flange, an annular tubular member receiving the inner edge of said annular flange, said member attached to the wheel rim, a securing wire embedded in the annular flange, clamps for retaining said annular tubular member in position on the wheel rim.

3. A mudguard for wheels comprising an annular elastic flange, an annular tubular member receiving the inner edge of said annular flange, said member attached to the wheel rim, a securing wire embedded in said annular flange, clamps for retaining said annular tubular member to said wheel rim, and means for holding said clamps against displacement.

4. A mudguard for wheels comprising an annular flange, an annular tubular member receiving the inner edge of said annular flange, said member attached to the wheel rim, a securing wire embedded in said annular flange, clamps for retaining said annular tubular member to said wheel rim, and adjustable means for holding said clamps against displacement.

5. A mudguard for wheels comprising an annular flange, an annular tubular member receiving the inner edge of said annular flange, said member attached to the wheel rim, a securing wire embedded in said annular flange, and means on said flange for retaining said flange in position.

In testimony whereof I have affixed my signature in presence of two witnesses.

FERNAND MALRAUX.

Witnesses:
CHAS. P. PRESSLY,
MIGUEL ZEROLO.

Copies of this patent may be obtained for five cents each, by addressing the "Commissioner of Patents, Washington, D. C."